United States Patent [19]

Notton

[11] 4,342,606

[45] Aug. 3, 1982

[54] SOLDERING COMPOSITION

[75] Inventor: John H. F. Notton, Reading, England

[73] Assignee: Johnson, Matthey & Co., Limited, London, England

[21] Appl. No.: 136,335

[22] Filed: Apr. 1, 1980

[30] Foreign Application Priority Data

Apr. 6, 1979 [GB] United Kingdom ................ 7912209

[51] Int. Cl.³ .......................................... B23K 35/34
[52] U.S. Cl. ...................................... 148/23; 148/25
[58] Field of Search ................................... 148/23, 25

[56] References Cited

U.S. PATENT DOCUMENTS 3,915,729 10/1975 Eustice .................................. 148/23
4,151,016 4/1979 Lee ....................................... 148/23

*Primary Examiner*—P. D. Rosenberg
*Attorney, Agent, or Firm*—Cushman, Darby & Cushman

[57] ABSTRACT

This invention relates to joining metallic parts by soldering and in particular to a soldering composition.

A soldering composition in accordance with the present invention is solid at ambient temperatures and comprises a particulate soldering alloy or metal or oxide precursor thereof dispersed in a thermoplastic material. Conveniently, the soldering composition also includes one or more fluxes.

18 Claims, No Drawings

SOLDERING COMPOSITION

This invention relates to joining metallic parts by soldering and in particular to a soldering composition.

Soldering is a commonly-used method of joining metallic parts, in which method an alloy of lower melting point than the parts to be joined, hereinafter referred to either as a soldering alloy or as a filler metal, is melted and allowed to flow with or without capillary action between the surfaces to be joined of the metallic parts. The metallic parts remain unmelted but are united when the soldering alloy solidifies and may not subsequently be separated by heating to a similar temperature. Typically, soldering alloys melt at a temperature in the range 200°–300° C.

In soldering operations, a flux is required to inhibit, during heating, oxidation of the filler metal and of the surfaces of the metallic parts being joined and to clean the said surfaces of any oxide or scale already present. The flux should also, however, be capable of flowing at a temperature below the melting point of the soldering alloy, should wet the surfaces of the metallic parts, should facilitate the wetting of the metallic parts by molten soldering alloy and should be capable of ready displacement by molten soldering alloy.

It is generally accepted practice in soldering operations either to brush flux onto the surfaces to be joined prior to applying the soldering alloy and heating, although other methods, such a dipping and spraying, have been used, or to use flux-cored soldering alloy in the form of wire. Alternatively, soldering pastes have been developed which consist essentially of a mixture of particulate soldering alloy, flux and aqueous or organic vehicle or diluent. The paste is merely applied to the surfaces to be joined and the region is then heated to mobilize and volatilize the vehicle and effect fluxing and soldering in what is for practical purposes essentially one operation. Such soldering pastes, however, suffer from one particular disadvantage, namely, a bad shelf life and this especially is the case where the flux is hygoscopic and tends to absorb atmospheric moisture. Bad shelf life may also occur due to one or more of several other reasons, for example, gradual loss of fluxing activity due to chemical reaction between flux and vehicle and also between flux and soldering alloy in the liquid medium, loss of vehicle by evaporation, and settlement of particulate soldering alloy. Furthermore, it has proved difficult to find a soldering paste formulation which is sufficiently stiff and non-flowable to minimise the settlement problem and to remain in place, having been applied to the surfaces to be joined, before soldering takes place and yet is sufficiently fluid readily to be applied to the said surfaces. Soldering pastes also tend to be temperature-sensitive in their application properties. For example, it may be difficult to apply the desired amount and/or the alloy: flux ratio may be difficult to control.

Brazing is another commonly-used metal joining technique, the fundamental difference between soldering and brazing is that brazing is carried out at temperatures sufficiently high to volatilize and/or burn off any carbonaceous residues from the brazing composition. Soldering, on the other hand, is carried out at a low temperature and residues remain on the workpiece unless or until they are removed in a separate operation. For most purposes, residues can be tolerated without removal although for cosmetic purposes it may be preferred to remove them. Residues which are water-soluble or water-dispersible are convenient in that they are readily removable. However, residues which are only or at least partically water-soluble may give rise to problems with corrosion and/or growth of micro-organisms such as algae and bacteria. It follows, therefore, that where soldering is used for effecting joints in potable water supply pipes, soldering residues should be substantially completely water-soluble or water-dispersible.

It is an object of the present invention to provide a soldering composition which overcomes some or all of the above reasons for bad storage and application properties of soldering pastes, and which leaves a residue on the workpiece which is either substantially completely water-soluble or substantially completely water-insoluble.

According to one aspect of the invention, a soldering composition comprises a particulate soldering alloy or metal or oxide precursor thereof dispersed in a thermoplastic material.

Preferably, a soldering composition according to the invention includes one or more fluxes. The flux may be in the form of a powder or it may be a material such as rosin which may itself possess the required thermoplastic properties.

Preferably, the soldering compositions of the invention comprise 50–98 wt % soldering alloy, balance flux and/or thermoplastic material and, more preferably, 75–95 wt % soldering alloy, balance flux and/or thermoplastic material.

As an example, a soldering composition according to the invention contains, apart from impurities, 90 wt % soldering alloy and 10 wt % flux and/or thermoplastic material. Conveniently, the thermoplastic material is in the solid phase at ambient temperatures and should melt below about 150° C. Preferably, the thermoplastic materials should melt in the range 40°–100° C.

The thermoplastic material generally may comprise a wax component and, optionally, a resin component. The wax serves to provide good storage properties and the resin component serves to maintain a certain viscosity on application of heat.

Waxes for use in the soldering composition of the invention may be selected from both natural and synthetic waxes. Examples of natural wax are spermaceti, beeswax and stearic acid (animal waxes), carnauba, bayberry and candellila waxes (vegetable) and montan, ceresin and paraffin waxes (mineral). Animal and vegetable waxes are generally fatty acid esters of higher monohydroxy alcohols. Examples of synthetic waxes are polyethylene and polyethylene glycol waxes (such as "Carbowax" (Registered Trade Mark) waxes) and microcrystalline wax. We prefer to use as inert (i.e. non-fluxing) thermoplastic materials, polyethylene glycol, alkoxylated carboxylic acids (e.g. ethoxylated stearic acid) or alkoxylated cholesterol carboxylic esters (e.g. ethoxylated lanolin) all of which are water-soluble or water-dispersible, or paraffin wax or cholesterol carboxylic acids (e.g. lanolin) which are water-insoluble. For thermoplastic materials which have fluxing activity, we prefer rosin, (i.e. a terpenoid carboxylic acid such as abietic acid), a saturated carboxylic acid having a carbon chain length from $C_{10}$ to $C_{20}$ (e.g. lauric, myristic, palmitic and stearic acids) or a hydroxy carboxylic acid such as citric acid or tartaric acid, and the fluxing activity of these may optionally be enhanced by the addition of materials having a stronger fluxing activity.

Resins for use in soldering compositions according to the invention may be selected from the range of natural and synthetic resins. Natural resins are solid or semi-solid viscous materials derived mostly from secretions of certain plants and trees. Examples are colophony, cellulose resins, natural rubber, pine tar, pitch and Canada balsam. Synthetic resins are amorphorous, organic, semi-solid or solid materials produced by polymerisation. Examples are polypropylene, polyethylene, polymethylmethacrylate, polyisoprene, polyisobutylene and polystyrene. These resins are thermoplastic.

Flux-enhancing materials which may be added to rosin include hydrazine hydrochloride, glutamic acid hydrochloride and aniline hydrochloride and these may be added to a concentration between 1 and 50% by weight based on rosin, preferably 5-20%, e.g. 10% depending on the desired level of flux activity. Materials which may be added to ether thermoplastic fluxes to enhance fluxing activity, or which may be added to inert thermoplastic materials to impart fluxing activity, include hydrazine hydroxide and halides which normally decompose on heating to liberate hydrogen halide, thus effecting fluxing activity under soldering conditions, such as the chloride, bromide or iodide of zinc, a zinc chloride/ammonium chloride eutectic mixture, the chloride, bromide or iodide or ammonium, and tin halides, e.g., tin chloride, and these may also be added at levels between 1 and 50% by weight, preferably 5-20%, e.g. 10%, based on the thermoplastic.

We have found that it is advantageous, in order to improve the degree of dispersion of the soldering alloy in the flux and/or thermoplastic material, to formulate soldering compositions according to the invention using a mixture of metal oxide particles rather than metal or alloy particles. The oxides are either reduced to the metals and thence to form soldering/alloy at soldering temperatures or are reduced to the metals at ambient temperatures by the use of reducing fluxes, for example hydrazine hydrochloride.

We have also found that the particle size of the soldering alloy should be selected for optimum soldering rather than optimum storage properties and these requirements tend to conflict. In an ideal soldering composition, a large concentration of small particle size soldering alloy would be desirable for good shelf life but such particles provide a large surface area of soldering alloy which consequently requires a relatively large quantity of flux. We accordingly prefer to choose a somewhat larger particle size thereby presenting a correspondingly lower surface area, and rely on an essential feature of the invention—that is, the inclusion of a thermoplastic material—to provide the required storage properties. We have found that, for most purposes, the soldering alloy particles should pass through a 60 mesh sieve and be retained by a 400 mesh sleve, although minor amounts of particles from outside this size range may be included if desired. This particle size range has been chosen to give optimum flow characteristics and minimum void space for filling with thermoplastic material. Futhermore, rheological problems associated with liquid soldering pastes are thus avoided. Optimum flow characteristics may also be provided by choosing particles in the form of spheroids and/or flakes, filings and so on.

The invention may be applied to any of the very wide range of soldering alloys in more or less common usage, but is, of course, particularly applicable to those soldering alloy which are typically used in large volume in automated soldering operations. Soldering alloys are commonly based on tin or lead with additions of one or more metals selected from the group Sb, Bi, Ag, Cu, Fe, Zn, Al, Cd and As. A list of typical soldering alloys may be found in Kirk-Othmer's "Encyclopaedia of Chemical Technology", 2nd Ed., Vol. 18, p.544. As a generalisation however, alloys of tin and lead are good general purpose solder alloys, antimony is often used in place of lead for soldering food containers, alloys of tin and silver are exceptionally free flowing, have enhanced strength compared with tin/lead, and have good electrical conductivity, and tin/lead/silver alloys are frequently used in the electronics industry for soldering silver-plated surfaces.

It is a feature of soldering compositions according to the invention that solvent or diluent as commonly used in prior art soldering paste compositions is entirely absent and further, as already stated above, the thermoplastic vehicle, which may or may not have intrinsic fluxing activity, is selected to be in the solid phase at ambient temperatures and to melt preferably below 100° C. If a polymer, for example, polyethylene glycol, is selected as the thermoplastic material, the degree of polymerisation should be such that the above phase and melting point limitations apply.

Soldering compositions are generally made by melting the thermoplastic material dispersing or dissolving therein the flux or flux additive, if present, dispersing therein the alloy, metal or oxide precursor thereof and allowing the resulting composition to solidify. They may, however, be cast, moulded or extruded into preformed shapes such as rings and the like for storage and subsequent use, or they may be applied in the molten or semi-molten condition to a workpiece and allowed to solidify for storage and pending subsequent use in joining the workpiece to a further workpiece by holding the two workpieces together and heating them in the region of the composition. Alternatively, soldering compositions according to the invention may be applied to a workpiece at ambient temperature via a heated applicator which may be at such a temperature that no further heating is required to effect a satisfactory soldered joint. Compositions according to the invention and comprising a hygroscopic or deliquescent flux such as zinc chloride are stable on storage due to the flux particles being effectively encapsulated by the thermoplastic material.

The following examples are illustrative of the invention. In each case, the soldering alloy comprised 60% tin, 40% lead, (% by weight).

EXAMPLE 1

A soldering composition consisting essentially of:
93.5 wt % alloy
6.5 wt % refined rosin ("Staybelite"—Registered Trade Mark, Hercules Powder Co.Ltd—resin)
was prepared by melting the rosin and dispersing therein the alloy. Residues from soldering are essentially water-insoluble.

EXAMPLE 2

A soldering composition consisting of:
80.0 wt % alloy
10.0 wt % $ZnCl_2$
10.0 wt % paraffin wax (melting range 46°-49° C.)

was prepared by melting the wax and dispersing therein the alloy and flux. Residues are essentially water-insoluble.

EXAMPLE 3

A soldering composition consisting essentially of:
91.5 wt % alloy
2.0 wt % NH$_4$I
6.5 wt % paraffin wax (46°–49° C.)
was prepared as in Example 2. Residues are essentially water-insoluble.

EXAMPLE 4

A soldering composition consisting essentially of:
93.5 wt % alloy
1.0 wt % refined rosin ("Staybelite" resin)
5.5 wt % paraffin wax (60°–62° C.)
was prepared by melting the wax, dissolving therein the rosin and dispersing therein the alloy. Residues are water-insoluble.

EXAMPLE 5

A soldering composition consisting essentially of:
90 wt % alloy
2 wt % ZnCl$_2$
8 wt % polyethylene glycol (mol. wt 1000)
was prepared by dissolving the flux at a temperature above its melting point (283° C.) in the glycol and dispersing therein the alloy at a temperature of above 60°–80° C. Alternatively, physical dispersion of the flux may be carried out at a temperature below its melting point. Residues are substantially water-soluble.

EXAMPLE 6

A soldering composition residues from which are substantially water-soluble was prepared as in Example 5 and consisted essentially of:
90 wt % alloy
2 wt % ZnCl$_2$
8 wt % ethoxylated stearic acid (Texofor—a trade name of ABM Chemicals Ltd—E13)

EXAMPLE 7

A soldering composition consisting essentially of:
90 wt % alloy
1 wt % ZnCl$_2$/NH$_4$Cl eutectic mixture
9 wt % polyethylene glycol (mol. wt 1000)
was prepared by suspending the flux mixture at a temperature above its melting point (180° C.) in the glycol and dispersing therein the alloy at a temperature of above 60°–80° C. Residues are substantially water-soluble.

EXAMPLE 8

A soldering composition residues from which are substantially water-soluble was prepared as in Example 7 and consisted essentially of:
90 wt % alloy
1 wt % ZnCl$_2$/NH$_4$Cl eutectic mixture
9 wt % ethoxylated stearic acid (Texofor E13).

I claim:

1. A soldering composition free of liquid vehicles and solid at below 40° C. consisting essentially of a particulate soldering alloy dispersed in a solid thermoplastic material melting in the range of 40° to 150° C.

2. A soldering composition according to claim 1 also including a flux.

3. A composition according to claim 1 in which the thermoplastic material itself has fluxing activity.

4. A composition according to claim 1 which comprises 50-98 wt % alloy.

5. A composition according to claim 1 which comprises 75-95 wt % alloy.

6. A composition according to claim 1 comprising 90 wt % particulate soldering alloy, metal balance thermoplastic material.

7. A composition according to claim 2 in which the flux is in the form of a powder.

8. A composition according to claim 1 in which the thermoplastic material comprises a wax selected from the group consisting of natural and synthetic waxes.

9. A composition according to claim 8 in which the wax is selected from the group consisting of polyethylene glycol, paraffin wax, an alkoxylated carboxylic acid and a cholesterol carboxylic ester.

10. A composition according to claim 1 in which the thermoplastic material includes a resin component.

11. A composition according to claim 2 in which the flux is selected from the group consisting of halides of zinc, tin and ammonium and hydrazine hydroxide.

12. A composition according to claim 3 in which the thermoplastic flux is selected from the group consisting of rosin, saturated carboxylic acids and saturated hydroxy carboxylic acids.

13. A composition according to claim 3 in which the fluxing activity is enhanced by the addition of a further material.

14. A composition according to claim 13 in which the further material is selected from the group consisting of hydrazine hydrochloride, glutamic acid hydrochloride and aniline hydrochloride.

15. A composition according to claim 1 in which the size of the particulate alloy is such that the preponderant amount of such material will pass through a 60 mesh sleve and be retained by a 400 mesh sieve.

16. A soldering composition free from any liquid vehicle and comprising a metallic component and a flux component characterised in that the soldering composition is solid at below 40° C., and that the metallic component is selected from the group consisting of soldering alloys, metals and oxides in particulate form, said metallic component being dispersed and encapsulated within a thermoplastic material.

17. A soldering composition free from any liquid vehicle and comprising a metallic component and a flux component characterised in that the soldering composition is solid at below 40° C., the metallic component is selected from the group consisting of soldering alloys, metals and oxides in particulate form, the major proportion of which will pass through a 60 BS mesh sieve and be retained by a 400 mesh sieve, and in that the particulate metallic component is dispersed in a thermoplastic material.

18. A soldering composition free from any liquid vehicle and comprising a metallic component and a flux component characterised in that the soldering composition is solid at below 40° C., the metallic component is selected from the group consisting of soldering alloys, metals and oxides in particulate form, the major proportion of which will pass through a 60 BS mesh sieve and be retained by a 400 mesh sieve, the particulate metallic component is dispersed in a thermoplastic material and in that the thermoplastic material melts in the approximate range from 40° C. to 150° C.

* * * * *